Dec. 2, 1958   M. J. RAFFENSPERGER   2,863,108
MOTOR DRIVE CIRCUIT
Filed March 15, 1956   4 Sheets-Sheet 1
FIG. 1
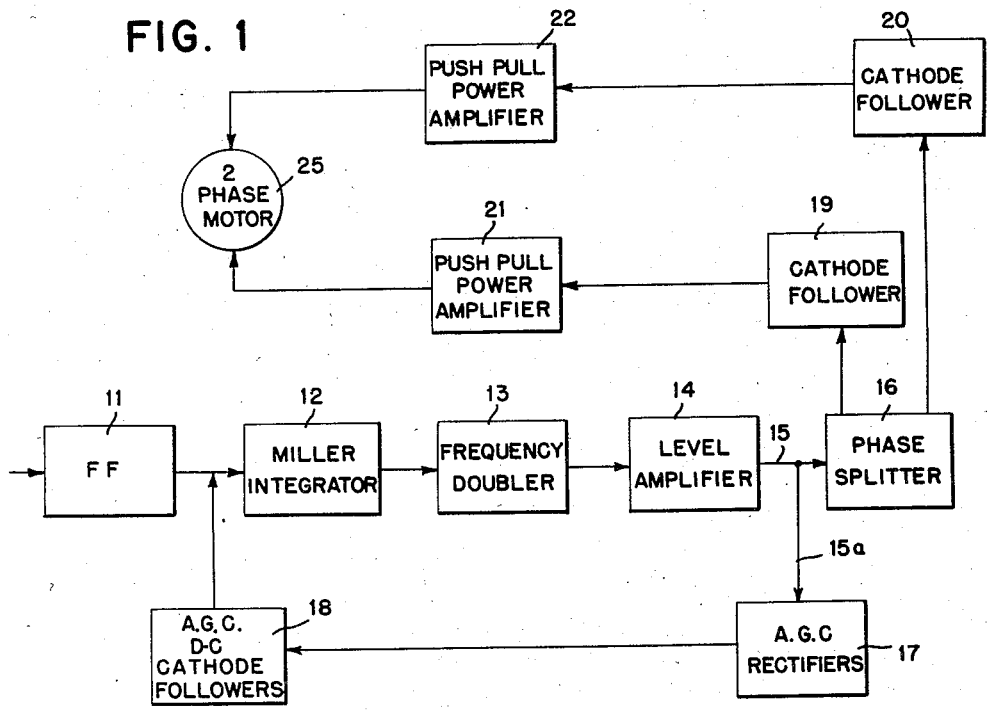
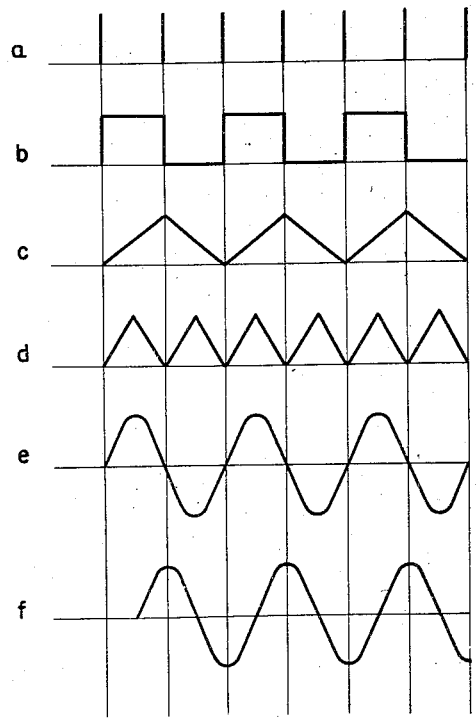
FIG. 2
INVENTOR
MAURICE J. RAFFENSPERGER
BY Joseph J. Connerton
ATTORNEY

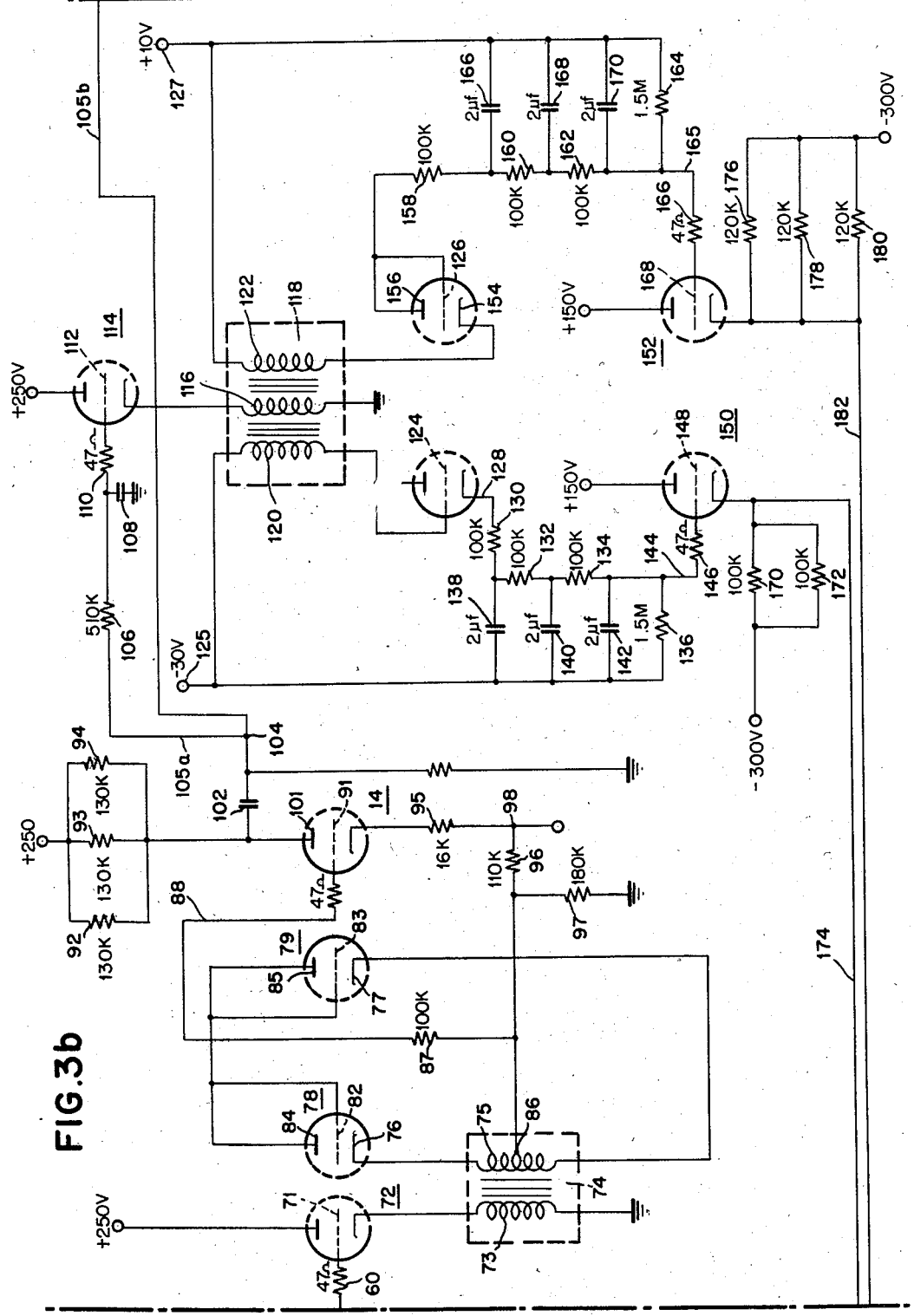

Dec. 2, 1958     M. J. RAFFENSPERGER     2,863,108
MOTOR DRIVE CIRCUIT

Filed March 15, 1956                       4 Sheets-Sheet 4

United States Patent Office 2,863,108
Patented Dec. 2, 1958

2,863,108

MOTOR DRIVE CIRCUIT

Maurice J. Raffensperger, Redondo Beach, Calif., assignor to International Business Machines Corporation, New York, N. Y., a corporation of New York Application March 15, 1956, Serial No. 571,803

12 Claims. (Cl. 318—171)

The present invention is directed to a motor control circuit and more particularly to a pulse responsive motor control circuit adapted to generate two phase displaced signals having a frequency corresponding to the repetition rate of the input pulses.

Motor control circuits of this character are applicable, for example, wherever it is desired to control the speed of rotation of a motor by means of discrete pulses applied thereto. Such circuits have particular utility in telemetering or similar remote control systems wherein it is desirable to control the rotation of a motor in synchronism with a remotely displaced driving source.

In accordance with the principles of the present invention, there is provided an improved pulse responsive motor control system for controlling the rotation of a motor through discrete pulses applied thereto. The system operates by converting a discrete pulse input having a relatively constant repetition rate through intermediate stages to a two phase substantially sinusoidal output having a frequency corresponding to the repetition rate of the discrete pulse input. Thus the rotation of the motor is synchronized with the discrete pulse input.

An object of the present invention is to provide an improved motor drive circuit wherein two 90° phase displaced signals are produced in response to applied pulse signals.

Another object of the present invention is to provide an improved pulse responsive motor control circuit adapted to produce two electrically quadrature substantially sinusoidal signals corresponding in frequency to the repetition rate of the input pulse signals.

A further object of the present invention is to provide an improved motor energizing circuit adapted to produce triangular waveform signals having a repetition rate corresponding to that of the input pulses.

Another object of the present invention is to provide an improved motor energizing circuit responsive to a discrete pulse input and adapted to convert said pulse input into a triangular signal having a repetition rate corresponding to that of the pulse output and further adapted to maintain a substantially uniform amplitude of the output signal over a relatively wide frequency variation.

Another and still further object of the present invention is to provide an improved pulse responsive motor energizing system for producing two electrically quadrature substantially sinusoidal output potentials by converting a pulse input into a triangular waveform having a repetition rate half the repetition rate of the input pulses, doubling the repetition rate of this triangular output and converting the resultant triangular signal to two 90° phase displaced substantially sinusoidal signals for controlling a synchronous motor.

Another object of the present invention is to provide an improved motor control apparatus adaptable to synchronize the rotation of a motor with a discrete pulse source.

Still another object of the present invention is to provide an improved motor control apparatus which converts a pulse input into a square wave output having a repetition rate half that of the pulse input, integrating said square wave into a triangular waveform having substantially the same repetition rate, converting said triangular waveform into a second triangular waveform having a repetition rate equal to that of the pulse input and transforming the second triangular waveform into two 90° phase displaced substantially sinusoidal potentials adaptable to energizing a two phase motor.

Other objects of the invention will be pointed out in the accompanying drawings, which disclose, by way of example, the principle of the invention and the best mode, which has been contemplated, of applying that principle.

In the drawings:

Fig. 1 illustrates in block form a preferred embodiment of the present invention.

Figs. 2a through 2f illustrate a family of waveforms starting with the input signals and progressing successively through intermediate stages to the two phase output from the phase splitting network.

Figure 3A:
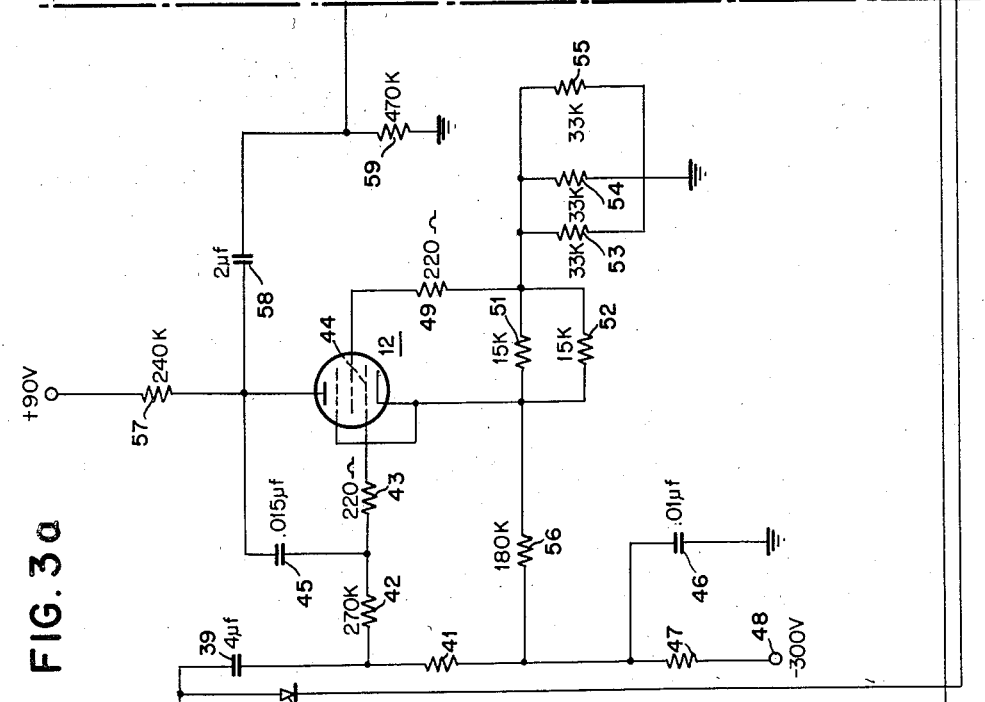
Figure 3A:
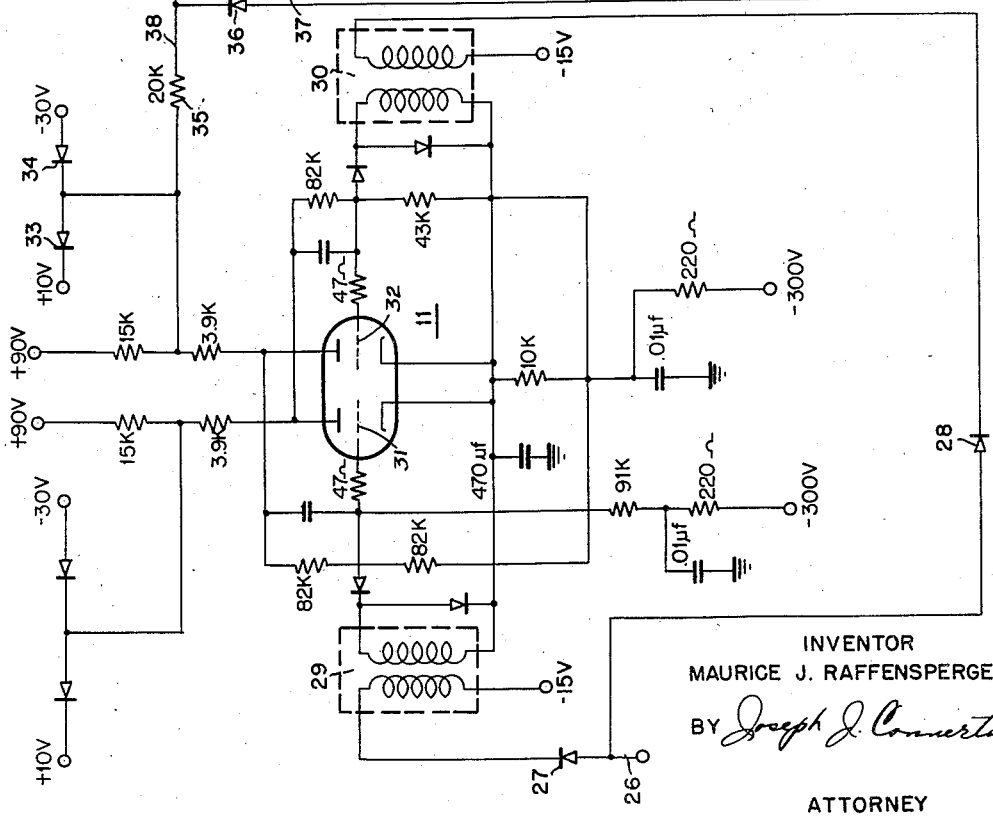
Figure 3C:
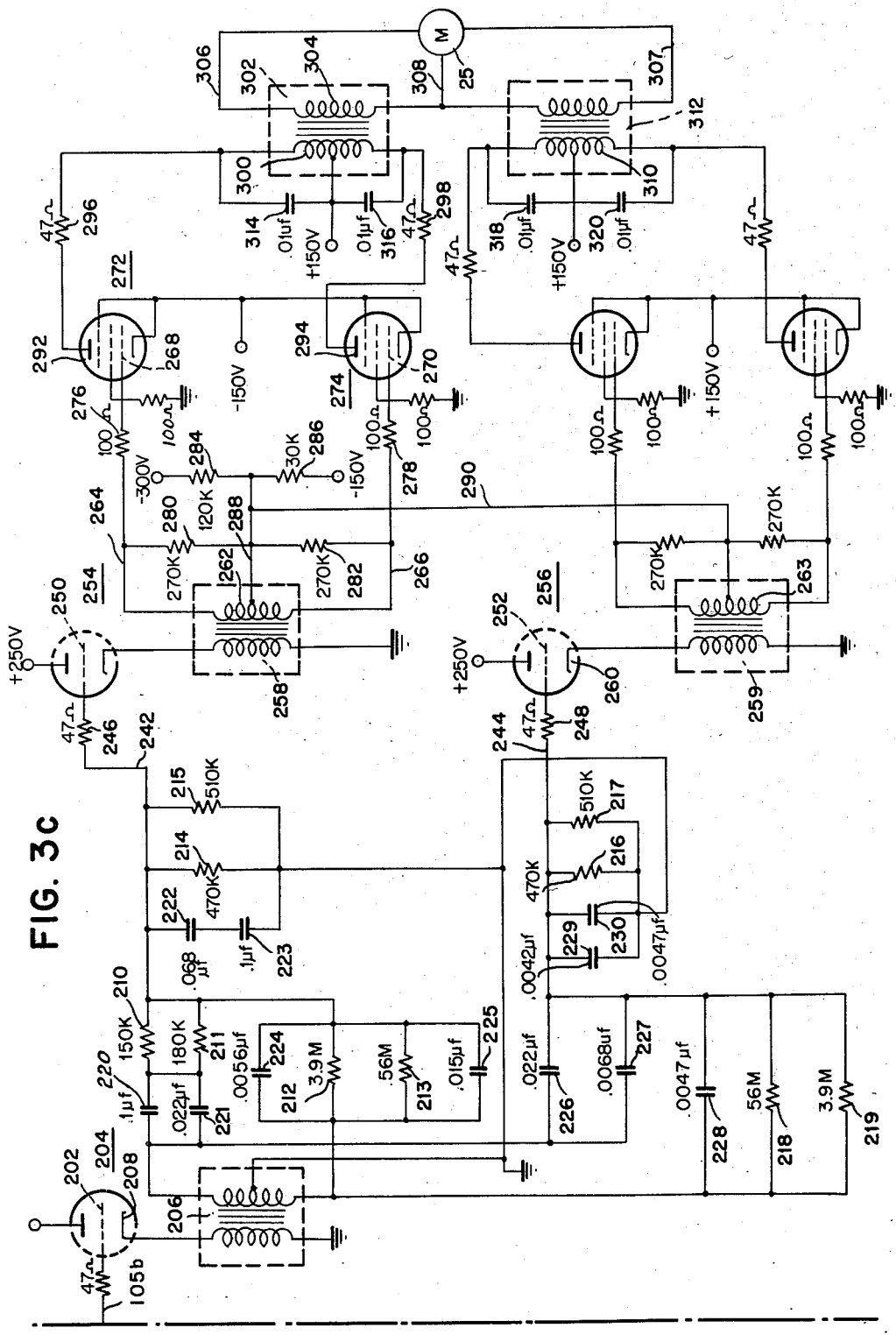

Figs. 3a, 3b and 3c, when arranged end to end, illustrate in schematic form a preferred embodiment of the present invention shown in block form in Fig. 1.

Referring to the drawings and more particularly to Fig. 1 thereof, there is illustrated in block form the circuits comprising a motor control system incorporating the features of this invention. As shown, the system comprises a flip-flop 11 actuated by pulses of short duration applied at substantially regular intervals. Since flip-flop 11 is binary connected, i. e., requires two input pulses to generate one cycle of a square wave, the output of the circuit consists of square waves having a repetition rate which is half the input pulse repetition rate. In the particular embodiment constructed, the circuit was designed to function over a 5:1 frequency range, which may vary, for example, between 8.5 and 42.5 cycles per second. The square wave output of flip-flop 11 is applied to Miller integrator 12, which integrates the rectangular waves to produce a series of triangular waveforms having the same repetition rate as the step function input applied thereto. These triangular waveforms are then applied to a frequency doubler stage 13, which converts the output from the Miller integrator to triangular waveforms having a repetition rate equal to the input pulse repetition rate. The triangular output of frequency doubler 13 is applied through a level amplifier 14 and conductor 15 to a phase splitting network 16, and is also applied via conductor 15a to an automatic gain control circuit. Due to the frequency response characteristics of a Miller integrator, in which the amplitude of the output frequency varies substantially inversely as the input signal frequency, an automatic gain control circuit comprising A. G. C. rectifier 17 and their associated cathode followers 18 is provided between the level amplifier output and Miller integrator input to ensure a substantially uniform amplitude of the signal applied to phase splitting network 16 over the above defined frequency range. Phase splitting network 16 generates two substantially sinusoidal waves which are phase displaced from each other by 90°, and which are then suitably amplified before being applied to a two phase motor 25. In the particular embodiment constructed, the two outputs from phase splitter 16 are applied through cathode follower stages 19 and 20 and push-pull amplifier stages 21 and 22 respectively to the two phase two pole hysteresis synchronous motor 25.

Since the signals applied to the motor are at the same frequency as the repetition rate of the input pulses, the motor will build up to synchronous speed and then rotate in synchronism with the pulse input. Thus, for example, if the input pulses are azimuth pulses from a remote radar site, the motor could be controlled to rotate in synchronism with the corresponding radar antenna. Motor 25 may be so characterized that it accelerates to synchronous speed from 100% slippage in a nominal time, thereby obviating the need of a separate motor start circuit.

Referring now to Fig. 2, there is shown a family of waveforms to illustrate the waveforms generated by the various stages shown and described in Fig. 1. It is to be understood that the waveforms of Figs. 2a through 2f do not represent actual quantitative values, but represent in a general way the qualitative variations of the voltages with time.

Curve "a" of Fig. 2 illustrates the 0.1 microsecond pulses applied to the input of flip-flop 11. Due to the extremely short duration of these pulses, they are shown as vertical lines. For purposes of this description, they may be assumed to have a repetition rate of 10 pulses per second.

Curve "b" of Fig. 2 illustrates the signal generated by flip-flop 11 in response to the pulses of curve "a" applied thereto. As shown and previously described, the output from the flip-flop comprises a square wave signal having a repetition rate half that of the input pulses, or in the assumed case, a repetition rate of 5 pulses per second.

Curve "c" of Fig. 2 illustrates the triangular waveform generated by Miller integrator 12 in response to the square wave input applied thereto. In the assumed case, the repetition rate of the triangular wave forms is 5 pulses per second.

Curve "d" of Fig. 2 illustrates the output signal from frequency doubler stage 13. As shown, this signal is a triangular waveform having a repetition rate corresponding to the pulse input (curve "a"), or in the assumed case, 10 pulses per second.

Curves "e" and "f" of Fig. 2 illustrate the two phase output from phase splitter 16. As shown and heretofore described, the outputs are electrically in quadrature or phase displaced by 90°. For ease of illustration, the output waveforms from the phase splitting network are shown as pure sine waves, although as heretofore described, the actual output signals from phase splitter 16 are only generally sinusoidal.

Referring now to Figs. 3a, 3b and 3c, there is illustrated in schematic form the preferred embodiment of the present apparatus. Input pulses are applied as complement pulses to conductor 26, thence via diodes 27 and 28 through transformers 29 and 30 to control grids 31 and 32 respectively of dual triode flip-flop 11. These input pulses may be positive 0.1 microsecond pulses varying in amplitude between 20 and 40 volts, which are inverted through the transformers 29 and 30 to negative 0.1 microsecond pulses which reverse the conduction state of the flip-flop circuit with each input pulse applied thereto. Because of this complement or binary operation, the output signal from flip-flop 11 is a square wave having a frequency which is half the repetition rate of the input pulses. Flip-flop 11 is a model "C" flip-flop of the type shown and described in copending application Serial Number 494,982 entitled "Magnetic Data Storage" filed by R. R. Everett et al. on March 17, 1955. Diodes 33 and 34 clip the square wave output from flip-flop 11 at levels of +10 and −30 volts, respectively.

Resistor 35 serves as the load resistor for clipping diodes 36 and 37, which control the level of the square wave input signal applied through conductor 38 to Miller integrator 12. Diodes 36 and 37 may vary the voltage levels applied to the Miller integrator to new values depending on the clipping voltages applied from an automatic gain control circuit to be described in greater detail hereinafter.

Due to the frequency response characteristics of a Miller integrator, if the amplitude of the input to the Miller integrator was uniform over the 5 to 1 frequency range, the amplitude of the output signal would vary inversely over a 1 to 5 range. Thus at the highest frequency, the amplitude of the output signal would be substantially one-fifth that of the output signal at the lowest frequency. However, the amplitude of the voltage applied to the phase splitting network 16 must be constant in order to provide a substantially uniform drive to motor 25 over the entire operating range of the present apparatus. The automatic gain control circuit was therefore provided to insure a uniform output by varying the signal level applied to the input of the Miller integrator. Thus a stabilized output signal from the Miller integrator is obtained by clipping the square wave input signal and employing an automatic gain control feedback circuit to set the level of the clipping diodes. The clipping levels provided by the automatic gain control circuit are such that the amplitude of the square wave input varies directly with the input signal. Since the output of the Miller integrator varies inversely with the input frequency, the net effect is an output which is substantially constant throughout the frequency range employed.

The output of flip-flop 11 is applied via conductor 38 and an RC coupling network comprising capacitor 39, resistors 41 and 42 and parasitic suppressor 43 to control grid 44 of Miller integrator 12. A Miller integrator is a circuit which generates a triangular output having a time base width equal to the period of a single cycle of a rectangular input wave function applied thereto. These circuits are well known in the art and are described, for example, in "Electronic Output Circuits" by Seely, published by McGraw-Hill, Electrical and Electronic Engineering Series 1950, pages 427 et seq. Resistor 42 and capacitor 45 in the feedback circuit of the Miller integrator control the time constant of the Miller integrator circuit. Capacitor 46 and resistor 47 form a decoupling network for the −300 volt supply at terminal 48. Resistor 49 in the screen grid circuit is a parasitic suppressor. Resistor 41 forms part of a bleeder network which includes resistors 51, 52, 53, 54, 55 and 56. The step function applied to the control grid 44 of the Miller integrator is integrated and appears across load resistor 57 as a triangular waveform having substantially the same frequency as that of the input step function, or half the frequency of the input pulses applied to the flip-flop. This triangular output is then RC coupled through capacitor 58, resistor 59 and parasitic suppressor 60 to control grid 71 of a driver stage 72.

Driver stage 72 essentially comprises a cathode follower having a primary winding 73 of a step-up transformer 74 in its cathode circuit. The output developed across secondary winding 75 of the transformer is applied to cathodes 76 and 77 of tubes 78 and 79 respectively, which together with their associated circuits comprise the frequency doubler stage shown as block 25 in Fig. 1.

The frequency doubler stage, as shown, essentially comprises a cathode follower driven full wave rectifier. The control grids 82 and 83 are connected to anodes 84 and 85 of tubes 78 and 79, respectively, causing those tubes to act as diodes. As a result of the full wave rectifier action of tubes 78 and 79, the output voltage at the center tap 86 of transformer 74 is a triangular wave having a frequency twice that of the input frequency, thereby corresponding to the repetition rate of the input data pulses. The output of the frequency doubler stage is then applied through resistor 87 and conductor 88 to control grid 91 of level amplifier stage 14.

Level amplifier 14 essentially comprises a triode amplifier having plate load resistors 92, 93 and 94 across which the output potential is developed. Cathode degeneration is provided by resistor 95 in the cathode circuit to ensure a substantially stable output signal. Resistors 96 and 97, connected between junction point 98 in the cathode circuit and ground, comprise a bleeder network which is utilized to supply the desired bias for the input to the level amplifier stage 14. The output from the level amplifier at anode 101 is coupled through capacitor 102 to terminal 104, from where it is applied via conductors 105a and 105b to an automatic gain control circuit and a phase splitting network respectively. The automatic gain control circuit will first be described, followed by a description of the phase splitting network.

The signal on conductor 105a is applied through a waveform shaping network comprising resistor 106 and capacitor 108. Resistor 106 and capacitor 108 assist the automatic gain control circuit to compensate for gain variations in the system resulting from frequency variation. Since the filtering effect of this RC network varies inversely as the frequency, the shaping network attenuates the high frequency component of the input waveform but allows the low frequencies to pass with negligible attenuation. This modified signal is then applied through parasitic suppressor 110 to control grid 112 of driver circuit 114.

Driver circuit 114 basically comprises a cathode follower having a winding 116 of transformer 118 in the cathode circuit. The potentials developed across transformer windings 120 and 122 are applied to two substantially identical filter sections, each filter section including a half wave rectifier and an associated filter network.

Due to the polarization of transformer windings 120 and 122, when a signal is applied to driver stage 114, diode 124 develops a positive potential output with respect to the reference potential of −30 volts at terminal 125, while diode 126 develops a negative potential output with respect to the reference potential of +10 volts at terminal 127. The rectifier filter sections comprising diode 124, resistors 130, 132, 134, 136 and capacitors 138, 140 and 142 produce a positive D. C. output with respect to the −30 volts reference potential on conductor 144, which is then applied through parasitic suppressor 146 to control grid 148 of cathode follower 150. Similarly, the combined rectifier and filter sections comprising diode 126, resistors 158, 160, 162, 164 and capacitors 166, 168 and 170 produce a negative D. C. output with respect to the +10 volts reference potential on conductor 165, which is then applied through parasitic suppressor 166 to control grid 168 of cathode follower 152.

In view of the above description it may be noted that the net effect of the signal input applied to driver 114 is to drive the output of the rectifiers from the +10 and −30 volt reference levels toward the mean voltage level of −10 volts. Moreover, the larger the amplitude of the input signal, the greater the deviation toward the mean potential. The parallel combination of resistors 170 and 172 in the cathode circuit of cathode follower 150 develops a potential which is applied through conductor 174 to clipping diode 36. Similarly, the output potential developed across the parallel combination of resistors 176, 178 and 180 in the cathode circuit of cathode follower 152 is applied through conductor 182 to clipping diode 37. Cathode followers 150 and 152 correspond to the A. G. C. cathode followers identified as block 18 in Fig. 1.

The above described automatic gain control circuit in combination with clipping diodes 36 and 37 constitutes an automatic means for maintaining a near constant output of the Miller integrator, since it acts to reinforce the step function input to the Miller integrator when the output of the integrator tends to fall due to frequency variation. Actually the output of the Miller integrator is slightly higher at the upper end of the frequency band than at the lower end of the frequency band, but this is desirable in the preferred embodiment since the torque that the motor must develop increases slightly at the higher frequencies due to the increased effects of friction and windage. The frequency sensitive circuit of resistor 106 and capacitor 108 limits the output level of the Miller integrator at the upper end of the frequency band. Thus the net effect of the automatic gain control circuit is to produce an output which is substantially constant throughout the frequency range employed.

In addition to the automatic gain control circuit, the output from level amplifier 14 is also applied through conductor 105b to a phase splitting network shown as block 16 in Figure 1. The function of the phase splitting network is to convert the triangular wave input into a two phase substantially sinusoidal output signal. The output signals must be electrically in quadrature, i. e., they must differ in phase by 90°. This is accomplished by the phase shifting network in the following manner.

The triangular output from the level amplifier is applied via conductor 105b to control grid 202 of cathode follower tube 204. Transformer 206, connected to cathode 208 of cathode follower tube 204, provides the coupling to the phase splitter network. Transformer 206 is a 1:3 step up transformer so that the potential output of the cathode follower is amplified before being applied to the phase splitting network. The phase splitting network in the preferred embodiment essentially comprises two constant amplitude, linear phase difference RC networks, the outputs of which remain 90° out of phase over the frequency range employed. The filtering networks employed in the preferred embodiment were empirically developed for optimum output under the heretofore prescribed frequency band, and a detailed description of the operation of such networks is not considered essential for an understanding of the present invention. Design considerations for such networks are described, for example, in "Design of RC Wide-Band 90-Degree Phase Difference Network" by Donald K. Weaver, Proceedings of the I. R. E., April 1954. The phase splitting network of the preferred embodiment is a bandpass type network comprising resistors 210 through 219 inclusive, and capacitors 220 through 230 inclusive. The secondary winding of transformer 206 is center tapped to ground to provide a common reference level for the two phase output. Since the phase splitting network herein described is of the bandpass variety, it maintains the 90° phase difference between the two outputs throughout a frequency range of approximately 8 to 120 cycles per second. Therefore this circuit provides the correct output phase relationship over the entire frequency range employed.

While the normal fundamental frequency employed in the preferred embodiment does not exceed 42.5 cycles per second, there is a third and fifth harmonic content in this signal as evidenced by the triangular wave shape. The outputs of the phase shifting networks are not triangular since the phase relationship between the higher order harmonics and the fundamental is not the same as exists at the input. Due to this phase shifting between the fundamental and harmonic frequencies, the output waveform of the phase shifting networks is substantially sinusoidal.

The quadrature signals on conductors 242 and 244 must be suitably amplified before being applied to the motor. In the particular embodiment constructed, these output signals are applied through parasitic suppressors 246 and 248 to control grids 250 and 252 of driver stages 254 and 256 respectively. Driver stages 254 and 256 essentially comprise modified cathode followers identified in Fig. 1 as blocks 19 and 20 having transformers in their cathode circuits to provide transformer coupling to push-pull amplifiers identified as blocks 21 and 22 in Fig. 1. Transformers 258 and 259 connected in the cathode circuit of driver stages 254 and 256 respectively are step up transformers having a 1:3 ratio which function to drive the push-pull amplifier stages.

Since the two push-pull power amplifiers and associated driver circuits are identical, a description of one of said circuits will suffice for an understanding of both. The output developed across secondary winding 262 of transformer 258 is applied through conductors 264 and 266 to control grids 268 and 270 of push-pull power amplifier tubes 272 and 274 respectively. Resistors 276 and 278 are utilized to suppress parasitic oscillations in the amplifier circuit. Resistors 280 and 282 connected across secondary winding 262 of transformer 258 are damping resistors to provide a stable output from the transformer to the push-pull amplifier. Resistors 284 and 286 connected through conductor 288 to the center tap of transformer secondary windings 262, and through conductor 290 to the center tap of transformer secondary 263 of transformer 259, comprise a bleeder network which establishes the grid bias on the four push-pull amplifier tubes, two of which are identified as tubes 272 and 274, between −150 and −300 volts.

The output from the push-pull amplifiers 272 and 274 is applied from anodes 292 and 294 through parasitic suppressors 296 and 298 to primary winding 300 of output transformer 302. Output transformer 302 is a power transformer having an impedance ratio of 10 to 1 which is utilized to match the impedance of the push-pull amplifiers with the impedance of the motor 25. The impedance of the push-pull amplifier is approximately 3600 ohms, while the impedance of the motor in the embodiment constructed is approximately 360 ohms.

The potential developed across transformer secondary winding 304 of transformer 302 is applied through conductors 306 and 308 to motor 25. As noted above, the push-pull amplifier associated with driver stage 256 is substantially identical in construction to the push-pull amplifier above described, and functions to deliver a similar but 90° phase displaced output across primary winding 310 of transformer 312. The output across the secondary is applied through conductors 307 and 308 to motor 25 to provide the second phase input for the two phase motor.

Capacitors 314 and 316 across primary winding 300 of transformer 302 are provided to damp any initial voltage surge which may occur when the equipment is first turned on. Capacitors 318 and 320 associated with transformer winding 310 perform a similar function.

In the particular embodiment as actually constructed, motor 25 is a conventional hysteresis synchronous motor having a nominal impedance of approximately 360 ohms which functions to provide a high and substantially uniform torque from synchronous speed to 100% slippage. A hysteresis synchronous motor was selected partially because of its superior starting torque characteristic and the fact that no auxiliary starting circuit is required. Motor 25 is adapted to drive an output shaft so that the motor drive circuit herein described could be utilized to synchronize such shaft from a discrete pulse input.

While there have been shown and described and pointed out the fundamental novel features of the invention as applied to a preferred embodiment, it will be understood that various omissions, substitutions and changes in the form and details of the device illustrated and in its operation may be made by those skilled in the art without departing from the spirit of the invention. It is the intention therefore, to be limited only as indicated by the scope of the following claims.

What is claimed is:

1. A pulse responsive motor control circuit adapted to synchronize the rotation of a motor with a succession of pulses applied thereto comprising means responsive to said pulses for generating a first signal having a repetition rate which is a function of the repetition rate of said pulses, means responsive to said first signal for generating a second signal having a repetition rate which corresponds to the repetition rate of said pulses, a motor, means responsive to said second signal for generating a plurality of phase displaced signals to energize said motor whereby said motor is controlled to rotate in synchronism with said pulse source.

2. A pulse responsive motor control circuit adapted to generate two substantially sinusoidal potentials corresponding in frequency to the repetition rate of the pulses applied thereto comprising means responsive to said pulses for generating a first signal having a repetition rate which is a function of the repetition rate of said pulses, means for converting said first signal to a second signal having a repetition rate differing from that of said first signal, said first and second signals having a waveform including odd harmonics of the fundamental frequency, a synchronous motor, and means responsive to said second signal for generating two substantially sinusoidal motor energizing potentials adapted to drive said motor in synchronism with said pulses.

3. An apparatus for snychronizing the rotation of a motor with the pulse input from a discrete pulse source comprising means for generating a first signal in response to the pulses from said discrete pulse source, said first signal having a repetition rate which is a function of the repetition rate of said pulses, means responsive to said first signal for generating a second signal having the same repetition rate but a different waveform than said first signal, means for converting said second signal to a third signal having a repetition rate corresponding to that of said pulse input and means responsive to said third signal for energizing said motor to thereby synchronize the rotation of said motor with said pulse input.

4. A pulse responsive motor energizing circuit comprising means responsive to said pulses for generating a first signal having a repetition rate which is a function of the repetition rate of said pulses, means responsive to said first signal for generating a second signal having a repetition rate which is a second function of said pulse repetition rate and means responsive to said second signal for generating a plurality of motor energizing signals in response to each of said second signals applied thereto.

5. A device of the character described in claim 4 wherein said plurality of motor energizing signals comprises two phase displaced signals.

6. A pulse responsive motor energizing circuit for generating motor control signals comprising means responsive to said pulses for generating a first signal having a repetition rate which is a function of the pulse repetition rate, means responsive to said first signal for generating a second signal having a repetition rate which is a second function of said pulse repetition rate, a motor and means responsive to said second signal for generating a plurality of motor control signals in response to each of said second signals applied thereto for controlling the rotation of said motor.

7. A motor energizing circuit for generating motor control signals at a frequency determined by the repetition rate of the pulses applied to said circuit comprising means responsive to said pulses for generating a first signal having a repetition rate which is a function of the repetition rate of said pulses, means responsive to said first signal for generating a second signal having a repetition rate which is a direct function of said pulse repetition rate and means responsive to each of said second signals for generating a plurality of motor energizing signals having a frequency corresponding to the repetition rate of said pulses.

8. A motor energizing circuit for generating motor control signals at a frequency determined by the repetition rate of pulses applied to said circuit comprising means responsive to said pulses for generating a first signal having a repetition rate which is a function of the repetition rate of said pulses, means responsive to said first signal for generating a second signal having a repetition rate which is a direct function of said pulse repetition rate, a motor and means responsive to each of said second signals for generating two phase displaced signals for controlling the rotation of said motor.

9. A motor control circuit adapted to synchronize the rotation of a motor with the input pulses to which said circuit is responsive comprising means responsive to said input pulses for generating a succession of square wave signals having a repetition rate which is a function of the repetition rate of said input pulses, means for integrating said square wave signals to obtain a first succession of signals having the same repetition rate as said succession of square waves, means for maintaining the amplitude of said integrated signals substantially constant over a relatively wide frequency variation, means responsive to said integrated signals for generating a second succession of signals having a different repetition rate than said integrated signals, a synchronous motor, means responsive to said second succession of signals for generating two phase displaced substantially sinusoidal signals and means for applying said phase displaced signals to said synchronous motor whereby said motor is caused to rotate in synchronism with said input pulses.

10. A device of the character claimed in claim 9 wherein said means responsive to said integrated signals for generating a second succession of signals comprises a frequency doubler circuit, the output signal repetition rate of which corresponds to that of said input pulses.

11. An apparatus for generating a succession of signals adapted to drive a rotating member in synchronism with the input pulses applied thereto comprising means responsive to said input pulses for generating a succession of first signals having a repetition rate half the repetition rate of said input pulses, means for converting said succession of first signals into a succession of second signals corresponding in frequency to the repetition rate of said input pulses and means responsive to each of said second signals for generating two substantially sinusoidal phase displaced signals corresponding in frequency to the repetition rate of said input pulses.

12. A circuit adapted to generate two substantially sinusoidal signals corresponding in frequency to the repetition rate of the pulses applied thereto comprising means responsive to said pulses for generating a succession of first signals having a first repetition rate, means for converting said succession of first signals to a succession of second signals having a repetition rate differing from the repetition rate of said first signals, said first and second signals having a waveform including odd harmonics of the fundamental frequency and means responsive to each of said second signals for generating two substantially sinusoidal potentials.

References Cited in the file of this patent
UNITED STATES PATENTS

| | | |
|---|---|---|
| 2,374,343 | Gibbs et al. | Apr. 24, 1945 |
| 2,418,112 | De Rosa | Apr. 1, 1947 |
| 2,634,388 | Harshbarger | Apr. 7, 1953 |